Patented June 24, 1930

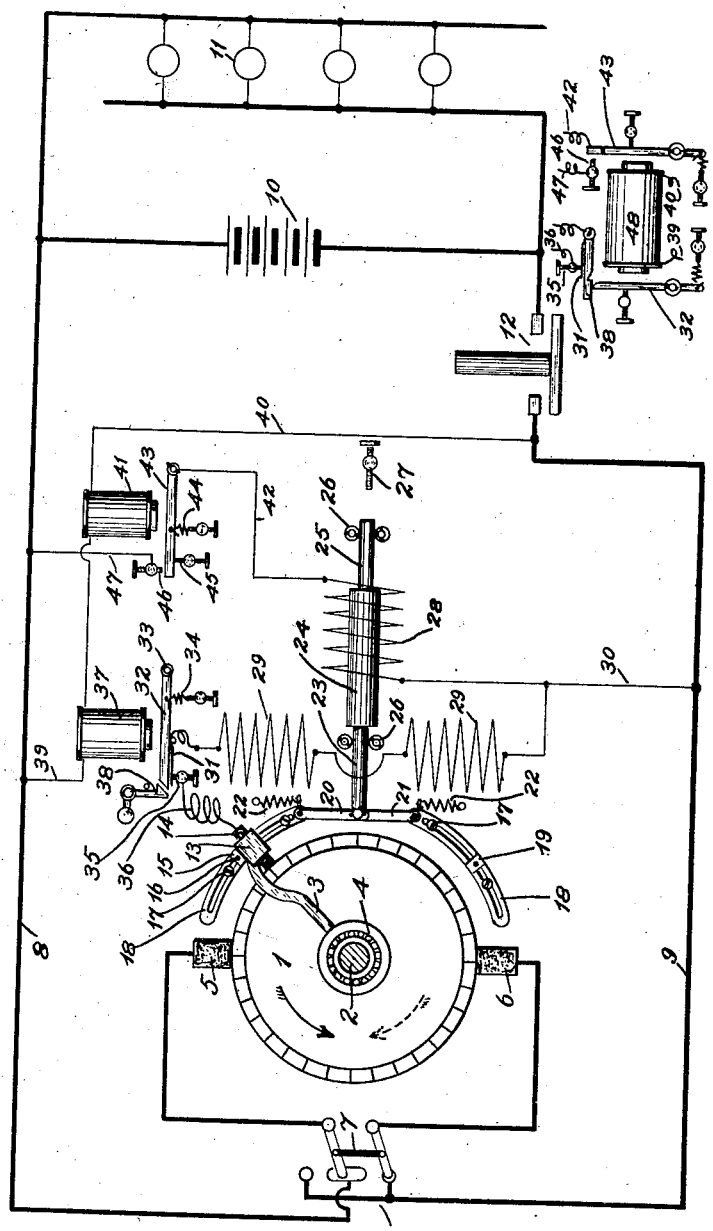

1,766,489

UNITED STATES PATENT OFFICE

JOHN L. CREVELING, OF ORACLE, ARIZONA, ASSIGNOR, BY MESNE ASSIGNMENTS, TO SIMPLEX EQUIPMENT COMPANY, INC., OF NEW YORK, N. Y., A CORPORATION OF DELAWARE

ELECTRIC REGULATION

Application filed June 6, 1924. Serial No. 718,314.

My invention pertains to that class of electric regulation employed to automatically regulate a dynamo or generator in a predetermined manner.

My invention has for its particular object to provide simple and effective means for regulating a generator which is subject to variable speed conditions and also subject to reversals in direction of rotation, and is particularly applicable for use in systems wherein such a generator is employed to charge a storage battery and operate lamps or other translating devices which are maintained by the said battery when the generator is ineffective. As my invention is particularly applicable to such systems as are now widely employed for lighting railway cars by power generated by rotation of one of the car axles, it will be described with particular reference to such a system.

In so far as common subject-matter is concerned, this application is a continuation of my application for improvement in electric regulation, Serial No. 146,412, filed February 3, 1917, which has matured in Patent No. 1,509,396, and my application for improvement in electric regulation, Serial No. 335,616, filed November 4, 1919, which has matured in Patent 1,509,397, wherein certain of the broad features employed in my present invention are disclosed and claimed.

Fig. I is a diagrammatic representation of one type of system illustrating an embodiment of my invention.

Fig. II is a diagrammatic representation of a modification of a portion of the structure indicated in Fig. I.

Referring to the drawing, particularly to Fig. I, 1 represents the commutator of a suitable dynamo or generator subject to variable speed and reversal in direction of rotation. The said commutator is indicated as upon the armature shaft 2, while 3 indicates an arm carried by any suitable bearing permitting the said arm to rotate about the axis of the shaft 2 and, in this instance, is indicated as supported by the outer ring of a ball-bearing the inner ring of which may either be mounted upon the shaft 2, as indicated, or stationary and supported in any suitable manner with the axis of the said shaft as a center. 5 indicates the positive brush and 6 the negative brush when the armature is supposed to be rotated in the direction of the full-line arrow upon the commutator 1, and these brushes are taken as having their polarity reversed upon reversal in direction of rotation of the armature,— that is, rotation in the direction indicated by the dotted arrow. 7 indicates one of any of the well-known types of automatic pole-changers adapted to shift the connections of the brushes 5 and 6 with respect to the circuits supplied by the generator upon reversal in direction of rotation of the armature, in such manner as to maintain the current from the generator beyond the pole-changer of uniform polarity. The wire 8 is led from the positive side of the pole-changer 7 to the positive terminal of the storage battery 10 and to the positive side of the lamps or other translating devices indicated at 11. The battery 10 and translating devices 11 have their negative terminals connected, as indicated, with one terminal of the automatic switch 12 the opposite terminal of which is connected as by wire 9 with the negative side of the pole-changer 7.

The automatic switch 12, the mere presence of which is here indicated for sake of simplicity in drawing, is preferably one of the type now well-known in the art, adapted to close its circuit when the generator voltage is substantially equal to that of the storage battery and to open the circuit when the generator voltage tends to fall slightly below this value so as to prevent back discharge from the battery through the generator.

13 is a brush-holder carried by the arm 3 and having mounted therein a suitable brush 14 bearing upon the commutator 1 and tending to revolve therewith in the direction of rotation of the armature until restrained by suitable means. 15 is a stop adjustably mounted as by screw 16 upon the segmental member 18, supported, as for example, by screws 17 passing through slots in the said member 18 and permitting the same to be moved in a circular path concentric with the shaft 2. A similar stop 19 is carried by a similar member 18 which is supported by similar screws 17 and indicated in a corresponding position below the shaft 2. The members 18 are connected by a pair of links 20 and 21 forming, in effect, a toggle-joint connection, while springs 22 tend to rotate the upper member 18 in a counter-clockwise direction and the lower member 18 in a clockwise direction so as to cause the links 20 and 21 to assume the position indicated in the drawing. 23 is a rod, preferably of non-magnetic material, pivotally connected with the links 20 and 21 and provided at one extremity with a core 24 of magnetic material, the opposite end of which is provided with a tail-rod 25 of non-magnetic material, while the rods 23 and 25 are indicated as supported by rollers 26 permitting free horizontal displacement but restraining any vertical movement of the rods or core 24. 27 is an adjustable screw limiting the amount of displacement that can be given the core 24 in a right-hand direction. 28 is a solenoid tending when energized to move the core 24 in a right-hand direction so as to cause the links 20 and 21 to move the members 18 and the stops 15 and 19 carried thereby toward a horizontal plane through the center of the shaft 2, while such movement, of course, will affect the position of the brush 14 in an obvious manner, for a purpose to be explained. One end of the coil 28 is connected with the wire 9 as by wire 30. 29 represents the shunt coils of the generator, one end of which is connected with the wire 30 and thus with the negative side of the generator regardless of the direction of rotation of the armature. The opposite end of the shunt coils is connected with the flexible contact, as indicated at 31, carried by the keeper 32 pivotally supported as at 33 and drawn in a downward direction as by adjustable spring 34 so as to normally hold the flexible contact 31 upon the contact screw 35, connected as by flexible connection 36 with the brush 14. 37 is an electromagnet tending when energized to raise the keeper 32 so as to break the connection between 31 and 35 and thus open the shunt field. 38 is a latch which may be used if desired to hold the keeper 32 from again establishing connection 31—35 when the keeper 32 has been attracted by the magnet 37 and then released by the said magnet. The magnet 37 is connected with the lead 8 as by means of the wire 39 and with the lead 9 as by means of the wire 40, and is shown as having in series therewith the electromagnet 41 for sake of simplicity in drawing, it being obvious that since the magnets 37 and 41 are both voltage responsive they may be either in series or in multiple across the leads 8 and 9, as may be desired, provided they be properly wound for either connection. The free end of the coil 28 is connected as by wire 42 with the pivotally supported keeper 43 of the magnet 41, while the keeper 43 is normally drawn in a downward direction as by spring 44 which tends to hold the said keeper against the adjustable stop 45. When attracted by the electromagnet 41, the keeper 43 causes contact with the adjustable screw 46 which is connected as by wire 47 with the lead 8.

In Fig. II there is shown a single electromagnet 48 adapted to be connected across the leads 8 and 9 in the same manner that the magnets 37 and 41 are connected across the said leads. The electromagnet 48 is provided at one end with a keeper 43 connected in the same manner as the keeper 43 of Fig. I, while the magnet 48 is provided at the other end with a keeper 32 adapted, when attracted by the magnet, to allow the latch member 38 to fall and hold the keeper 32 and break connection between 35 and 31, this figure being used merely to show that the devices operated by the magnets 37 and 41 may both be operated by one electromagnet, if desired.

An operation of my invention is substantially as follows:

If the generator be at rest or running at low speed in the direction indicated by the full-line arrow, the parts will be in the positions indicated in the drawing and the switch 12 will be open and the translating devices 11 supplied by the battery 10 in an obvious manner. If the generator speed be raised until its voltage is slightly in excess of that of the storage battery 10, the main switch 12 will be closed and current will flow from the brush 5 through the pole-changer 7 and wire 8 to the battery 10 and translating devices 11, from which return is made through the main switch 12 and wire 9. While so operating, the shunt field of the generator is supplied by current flowing from the commutator through brush 14, flexible connection 36, contact screw 35, flexible contact 31, field coils 29, wire 30, wire 9, pole-changer 7 and brush 6 to the commutator. I now so adjust the position of the stop 15 upon the member 18, and therefore the position of the brush 14, that with the desired maximum output delivered by the generator at its critical speed, further speed increases will not cause this output to be exceeded appreciably owing to the field distortion affecting the voltage across the shunt coils 29 which may be regulated by regulating the position of the brush 14 in such manner as to cause the generator to deliver substantially constant current, or as near so as desired, throughout speed changes. If, now, the battery be charged until it reaches a fully charged condition, I so adjust the spring 44 and screw 45 that when the voltage across the battery and generator circuit indicates that the battery no longer requires charging, this voltage will cause magnet 41 to raise its keeper 43 and cause contact between the said keeper and the screw 46; and I usually so arrange the magnet 41 and its keeper 43 that when the said magnet has raised the keeper and completed the circuit at 43—46 a considerably lesser voltage will be able to hold the keeper than was required to lift it, and the keeper will therefore not be released until a desired fall in voltage across the generator is reached, as may be adjusted. The completing of the circuit at 46—43 will allow current to flow from the lead 8 to the lead 9 through the coil 28 and cause the same to move the core 24 in a right-hand direction and, by drawing the united ends of the links 20 and 21 in this direction against the action of springs 22, the members 18 will both be caused to approach a horizontal plane through the axis of the shaft 2. This will shift the brush 14 away from the positive brush 5 and decrease the potential difference across the field coils 29 in such manner as to cut down the output of the generator which will still remain self-regulating as regards speed changes at a reduced output. And I so adjust the screw 27 that attraction of the core 24 by the coil 28 will cause the generator output to be reduced to a desired value or even to substantially a negligible amount, when desired. If, now, the generator slow down until its voltage is below that of the battery, switch 12 will open and the magnet 41 will release the keeper 43 and break the connection 43—46, whereupon the core 24 will return to the position shown in the drawing and the springs 22 will return the members 18 to the positions indicated in the drawing; while the friction between the brush 14 and the commutator will cause it to follow the stop 16 into the position indicated in the drawing, whereupon if the generator speed be increased the generator will again supply its normal output until that voltage across the battery is reached indicating a fully charged condition, whereupon the magnet 41 will again make the connection 46—43 and coil 28 by attracting the core 24 will cause the brush 14 to be shifted away from the brush 5 and the output of the generator will again be lessened to the minimum amount desired while the battery still remains at high voltage. Should the generator stop, the contact 46—43 will again be broken and the parts will return to the positions indicated in the drawing; and, if the direction of rotation now be reversed, the brush 14 will revolve with the commutator 1 in the direction of the dotted arrow until arrested by the stop 19 and the automatic pole-changer 7 will shift the connections of brushes 5 and 6 so that the brush 14 will occupy, when against the stop 19, the same relative position with regard to the positive brush 6 that it did with regard to the positive brush 5 when the armature was rotating in the opposite direction, and the regulation of the generator for speed changes will be carried out precisely as when the armature was rotating in the reverse direction. If, now, the voltage again rise until a fully charged battery is indicated, magnet 41 will again make the contact 43—46 and coil 28 will again move the core 24 in a right-hand direction and, by moving the stop 19 against the direction of rotation of the armature, cause the brush 14 to assume the same relative position that it caused it to assume when the direction of rotation was reversed, and the output will therefore be cut down in the same manner as when the armature was revolving in the reverse direction. If at any time, regardless of the direction of rotation of the armature, the battery circuit, for example, should become broken so as to destroy the self-regulating effect of the generator throughout speed changes, the voltage of the generator would tend to rise beyond that value desired at any time in normal operation; and I so adjust and arrange the magnet 37, keeper 32 and spring 34 that when this rise in voltage takes place magnet 37 will attract the keeper 32 and break the shunt field at 31—35, whereupon the latch 38 will engage the keeper 32 and hold the shunt field circuit open and protect the dynamo until the latch 38 is manually disengaged. Therefore, the generator is at all times protected against an excess in voltage which might take place as, for example, when a battery lead is open, as above pointed out.

An operation of that modification indicated in Fig. II may be readily followed from the above, it merely being noted that when the fully charged battery voltage is reached magnet 48 attracts the keeper 43 and closes the contact 42—46, and when an excess voltage is reached 48 attracts the keeper 32 causing the circuit 31—35 to be broken and remain so until repairs may have been made and the keeper 32 manually released.

It will be obvious that the circuit-breaker operated by the magnet 37 and the relay operated by the magnet 41 may be replaced by the structure of Fig. II, and it will further be obvious that the specific types of relay and circuit-breaker used may be selected from among the devices of this character now well-known in the art, the specific types herein shown being selected on account of their simplicity merely for matter of illustration as the specific type employed does not form part of my present invention.

From the foregoing it will be noted that I have produced a system wherein a self-regulating dynamo of the "third brush" type retains its self-regulating characteristics regardless of direction of rotation and wherein the value of the output of the generator is automatically reduced to a desired minimum when the battery becomes charged and wherein the generator is at all times protected from injury in case the self-regulating feature be destroyed, and that these features are accomplished by the use of simple and rugged mechanism of an inexpensive type, making my invention particularly applicable to the art of carlighting.

I do not in any way limit myself to any of the constructions shown or described or to the exact mode of operation outlined above, for it is obvious that wide departure may be made in the way of construction of the apparatus as well as in mode of operation without departing from the spirit and scope of my invention which is as set forth in the following claims.

I claim:

1. The combination with a variable speed generator having a commutator, an external circuit connected therewith and a field circuit, of means for connecting the field circuit independently with said commutator, said means being adapted to change its position with respect to said commutator upon reversal in rotation thereof.

2. The combination with a variable speed generator having an armature and a commutator, an external circuit including a storage battery connected therewith, a field circuit and means for connecting the field circuit independently with said commutator to produce inherent regulation of said generator, and a pole-changer for changing the connection of said generator with the storage battery upon changes in direction of rotation of its armature, of means whereby the connection of the field circuit with the commutator is caused to assume a position compensating for changes in the direction of rotation in said armature.

3. The combination with a variable speed generator having an armature and a commutator, an external circuit including a storage battery connected therewith, a field circuit and means for connecting the field circuit independently with said commutator to produce inherent regulation of said generator, and a pole-changer for changing the connection of said generator with the storage battery upon changes in direction of rotation of its armature, of means whereby the connection of the field circuit with the commutator is caused to assume a position compensating for changes in the direction of rotation in said armature whereby it occupies the same relative position with respect to the axis of commutation regardless of direction of rotation of said armature.

4. The combination with a variable speed generator having an armature, a commutator, field exciting means, means for connecting an external circuit with said commutator, an external circuit, and a storage battery in connection therewith, of means for connecting the field exciting means with said commutator at a point differing from that of the main circuit connection and causing said connection with the commutator to change to perform the same function regardless of direction of rotation of said armature.

5. The combination with a variable speed generator having a commutator, a field exciting means, means for connecting an external circuit with said commutator, an external circuit and a storage battery in connection therewith, and means for connecting the field exciting means with said commutator at a point differing from that of the main circuit connection, of means for affecting the point of connection of said field exciting means to vary the excitation of the field exciting means upon changes in voltage of said battery, and means causing the point of connection of said field exciting means to so vary as to maintain its function constant irrespective of direction of rotation of said commutator.

6. The combination with a storage battery and a variable speed dynamo arranged to charge the same comprising field exciting means affected by the shifting of the axis of commutation upon speed changes so as to tend to produce automatic inherent regulation of the dynamo while charging the battery, and means affected by movement of the commutator for preserving the inherent regulating function upon reversal of direction of operation of said dynamo.

7. The combination with a storage battery and a variable speed dynamo arranged to charge the same comprising field exciting means effected by the shifting of the axis of commutation upon speed changes so as to tend to produce automatic inherent regulation of the dynamo while charging the battery, means for preserving the inherent regulating function operated by the reversal of direction of operation of said dynamo, and means cooperating therewith for affecting the inherent regulating function affected by the voltage across the battery.

8. The combination with a storage battery and a variable speed dynamo arranged to charge the same comprising field exciting means affected by the shifting of the axis of commutation upon speed changes so as to tend to produce automatic inherent regulation of the dynamo while charging the battery, of means for preserving the inherent regulating function upon reversal of direction of operation of said dynamo, and means cooperating therewith for affecting the inherent regulating function affected upon changes in the condition of said battery.

9. The combination with a storage battery and a variable speed dynamo arranged to charge the same comprising field exciting means affected by the shifting of the axis of commutation upon speed changes so as to tend to produce automatic inherent regulation of the dynamo throughout speed changes while charging the battery, means for preserving the inherent regulating function upon reversal of direction of operation of said dynamo, and means cooperating therewith for affecting the inherent regulating function affected by the voltage across the battery, of means for further affecting said dynamo upon failure of its inherent regulating characteristic.

10. The combination with a storage battery and a variable speed dynamo arranged to charge the same comprising field exciting means affected by the shifting of the axis of commutation upon speed changes so as to tend to produce automatic inherent regulation of the dynamo while charging the battery, of automatic means for substantially terminating the battery charging current by affecting the inherent regulating function of said generator.

11. The combination with a storage battery and a variable speed dynamo arranged to charge the same comprising field exciting means affected by the shifting of the axis of commutation upon speed changes so as to tend to produce automatic inherent regulation of the dynamo while charging the battery, of automatic means for substantially terminating the battery charging current by affecting the inherent regulating function of said generator and adapted to so operate regardless of direction of operation of said dynamo.

12. The combination with a storage battery and a variable speed dynamo arranged to charge the same comprising field exciting means affected by the shifting of the axis of commutation upon speed changes so as to tend to produce automatic inherent regulation of the dynamo throughout speed changes while charging the battery, means for preserving the inherent regulating function upon reversal of direction of operation of said dynamo, and means cooperating therewith for affecting the inherent regulating function affected by the voltage across the battery, of means for further affecting said dynamo upon further rise in voltage.

JOHN L. CREVELING.